United States Patent
Kim et al.

(10) Patent No.: US 11,252,682 B2
(45) Date of Patent: *Feb. 15, 2022

(54) POWER BOOST IN COMMUNICATION SYSTEM

(71) Applicant: Lantiq Beteiligungs-GmbH & Co. KG, Neubiberg (DE)

(72) Inventors: Joon Bae Kim, Lexington, MA (US); Vladimir Oksman, Morganville, NJ (US)

(73) Assignee: LANTIQ BETEILIGUNGS-GMBH & CO. KG, Neubiberg (DE)

(*) Notice: Subject to any disclaimer, the term of this patent is extended or adjusted under 35 U.S.C. 154(b) by 557 days.

This patent is subject to a terminal disclaimer.

(21) Appl. No.: 13/913,502

(22) Filed: Jun. 9, 2013

(65) Prior Publication Data

US 2013/0265920 A1 Oct. 10, 2013
US 2017/0332336 A9 Nov. 16, 2017

Related U.S. Application Data

(63) Continuation of application No. PCT/EP2011/006221, filed on Dec. 9, 2011.

(60) Provisional application No. 61/421,571, filed on Dec. 9, 2010.

(51) Int. Cl.
*H04B 7/00* (2006.01)
*H04W 52/52* (2009.01)
*H04L 29/08* (2006.01)

(52) U.S. Cl.
CPC .......... *H04W 52/52* (2013.01); *H04L 69/323* (2013.01); *H04B 2203/5408* (2013.01)

(58) Field of Classification Search
CPC .............................................. H04W 52/04–60
See application file for complete search history.

(56) References Cited

U.S. PATENT DOCUMENTS

2008/0056404 A1* 3/2008 Miller .................. H03F 1/32
375/286
2008/0214182 A1* 9/2008 Wang .................. H04B 7/2606
455/423

(Continued)

FOREIGN PATENT DOCUMENTS

| CN | 101904139 A | 12/2010 | |
| JP | WO2011001466 A1 * | 6/2011 | ............ H04W 52/52 |
| WO | 0150795 A1 | 7/2001 | |

OTHER PUBLICATIONS

ETSI TS 102 178 V1.3.2 (Mar. 2006) (Broadband Radio Access Networks (BRAN); HiperMAN; Data Link Control (DLC) layer).*

(Continued)

*Primary Examiner* — Abdelillah Elmejjarmi

(74) *Attorney, Agent, or Firm* — 2SPL Patent Attorneys PartG mbB; Kieran O'Leary

(57) ABSTRACT

Representative implementations of devices and techniques provide communication between networked nodes operating on a communication network medium. In an implementation, a node generates a broadcast frame that includes at least a preamble and a payload. The preamble of the broadcast frame may include auxiliary information. The auxiliary information may be associated with one or more symbols of the preamble. The auxiliary information may contain power boost information.

18 Claims, 6 Drawing Sheets

(56) References Cited

U.S. PATENT DOCUMENTS

| | | | |
|---|---|---|---|
| 2008/0227476 A1* | 9/2008 | Cho | H04W 52/146 |
| | | | 455/522 |
| 2009/0245092 A1* | 10/2009 | Sampath | G06F 17/142 |
| | | | 370/210 |
| 2012/0100816 A1* | 4/2012 | Tandai | H03G 3/3078 |
| | | | 455/69 |

OTHER PUBLICATIONS

ITU-T, G.9960, Oct. 2009.*
Broadband Radio Access Networks (BRAN); HiperMAN; Data Link Control (OLC) layer; ETSI TS 102 178, IEEE, Lis, Sophia Antipolis Ceoex, France, vol. BRAN, No. V1.3.2, Mar. 1, 2006 (Mar. 1, 2006), XP014033876, ISSN 0000-0001.
Extended European Search Report dated Jul. 4, 2017 for European Application EP17159454.2-1874.
Final Office Action dated Dec. 29, 2017 in connection with U.S. Appl. No. 15/453,497.
Final Office Action dated Mar. 7, 2019 in connection with U.S. Appl. No. 15/453,497.

* cited by examiner

POWER BOOST IN COMMUNICATION SYSTEM

RELATED APPLICATIONS

This Application is a Continuation of International Application Number PCT/EP2011/006221, which was filed on Dec. 9, 2011. The International Application claimed priority to U.S. Provisional Application 61/421,571, which was filed on Dec. 9, 2010. The priority of the two identified prior filed applications is hereby claimed. The entire contents of the two identified prior filed applications are hereby incorporated herein by reference.

BACKGROUND

Power boost may be used in communication systems to enhance the detection of a packet by increasing a transmit power of certain symbols, such as the preamble and/or header, above the nominal transmit level of the payload.

Existing specifications, such as IEEE 1901, provide a power boost mechanism. However, the amount of power boost is fixed (e.g., 0.8 dB) and the applicable symbols are predefined (e.g., preamble and header). Because the electromagnetic compatibility (EMC) regulations vary from region to region, and the amount of optimal power boost may vary depending on the network size and traffic characteristics, requiring fixed power boost parameters may require communication systems to operate inefficiently.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Representative implementations of devices and techniques provide communication between networked nodes operating on a communication network medium. In an implementation, a node generates a broadcast frame that includes at least a preamble and a payload. The preamble of the broadcast frame may include auxiliary information. The auxiliary information may be associated with one or more symbols of the preamble. The auxiliary information may contain power boost information. The broadcast frame may be sent to one or more nodes in a communication network. A node in the communication network may use the power boost information to change (e.g., increase) or set a power level associated with one or more symbols of a data frame for transmission on the communication network medium. The power boosted symbols of the data frame may enable a receiving node to efficiently and successfully detect the frame. Moreover, the use of such auxiliary information may enable a node to seamlessly function in regions that have varying symbol power level regulations.

Various power boost implementations, including techniques and devices, are discussed with reference to the figures. The techniques and devices discussed may be applied to any of various network designs, circuits, and devices and remain within the scope of the disclosure.

Implementations are explained in more detail below using a plurality of examples. Although various implementations and examples are discussed here and below, further implementations and examples may be possible by combining the features and elements of individual implementations and examples.

Example Communication System

Figure 1:
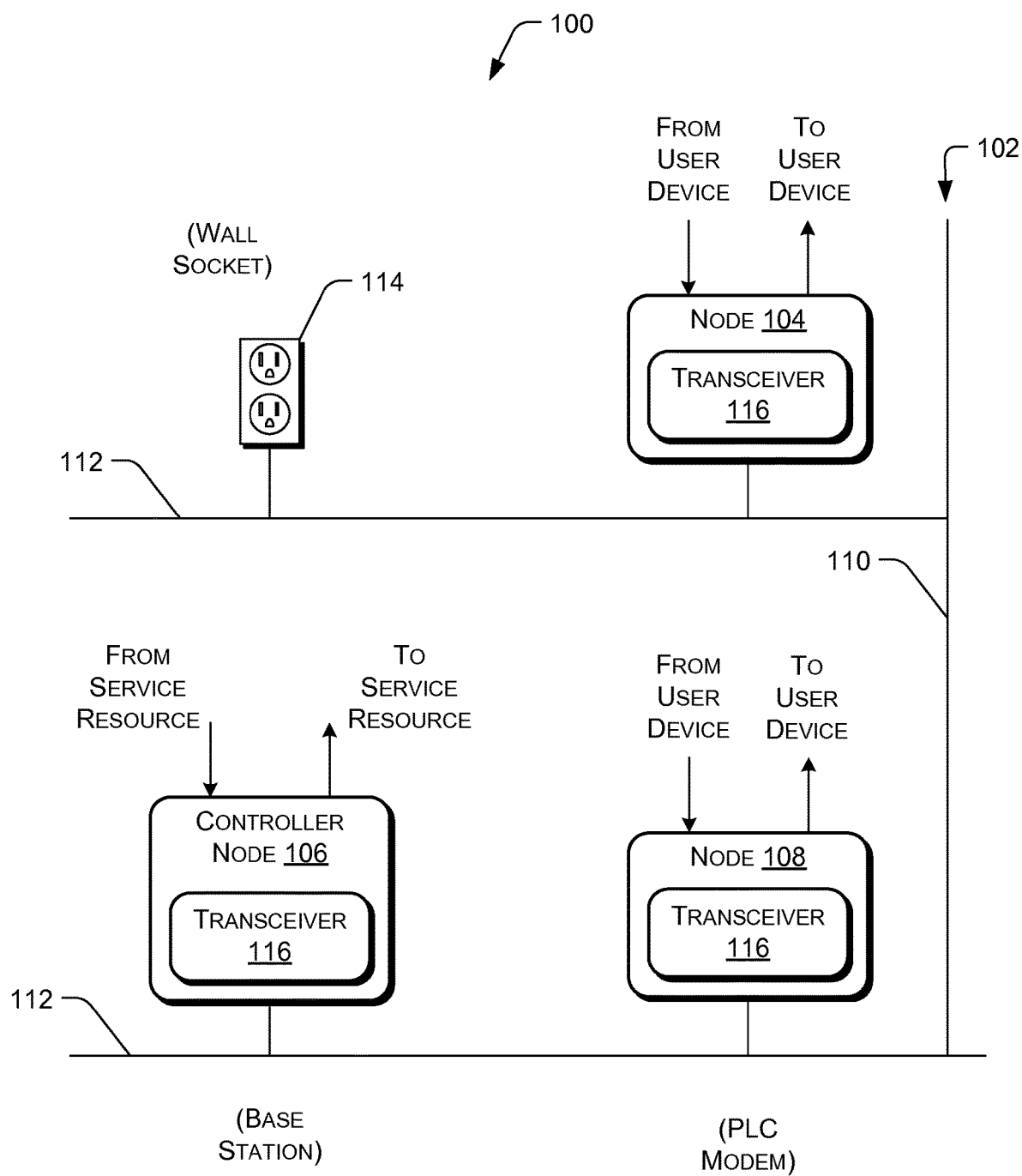
FIG. 1 is schematic of an example network or system in which the techniques in accordance with the present disclosure may be implemented.

In one implementation, as shown in FIG. 1, a system 100 comprises a communication network medium 102 shared by at least two nodes (e.g., nodes 104, 106, and 108) coupled to the medium 102. The nodes 104-108 are arranged to communicate at least in part via the medium 102. In one implementation, the system 100 is a multicarrier arrangement or system. In various alternate implementations, the system 100 based on the communication network medium 102 comprises a single communication channel and the nodes 104-108 represent discrete homogeneous networks communicatively coupled to the single communication channel.

The medium 102 may be comprised of a trunk or feeder 110 and one or more branches 112. In one example, the system 100 is a power line communication (PLC) system. In that case, the trunk 110 and branches 112 are electrical power distribution conductors (e.g., power lines) arranged to distribute electric power to one or more end user locations (e.g., within residences, commercial or professional suites, industrial sites, etc.). In the example, nodes 104-108 are coupled to the electric power lines and arranged to communicate at least in part via the electrical power lines. While the disclosure, including the figures and the discussion herein, discuss the techniques and devices disclosed in terms of a PLC system, the techniques and devices may be used for minimizing or eliminating neighbor network interference on other types of networks (e.g., wired and/or wireless, optical, etc.) without departing from the scope of the disclosure. For example, the medium 102 may be realized as a wireless communication medium, a wire line communication medium (e.g., coaxial cable, twisted pair of copper wires, power line wiring, optical fiber, etc.), or as combinations thereof.

As shown in FIG. 1, nodes 104-108 may be coupled to the medium 102 via one or more power outlets 114. For example, a node (104-108) may be "plugged in" to a wall socket (power outlet 114). Alternately, nodes 104-108 may be hardwired to the medium 102, or may be coupled in another manner allowing communication via the medium 102 (e.g., inductive coupling, optical coupling, wireless coupling, etc.).

As shown in FIG. 1, nodes 104-108 may also have connection to and/or from user devices, service resources, and the like. For example, a node (104-108) may be communicatively coupled to a user communications device, an automation console, a surveillance hub, a power usage monitoring and/or control interface, a service provider feed, a utility connection, and so forth. In one implementation, one or more of the nodes 104-108 is a controller node 106 (e.g., base station, master node, etc.) arranged to control communication of information with regard to the network. For example, a controller node 106 may receive an entertainment feed from a service provider, and distribute content to other nodes on the network (such as nodes 104 and 108) as well as optionally provide for content consumption at the controller node 106 itself. In one case, the controller node 106 may control the type of content that is distributed to the other nodes 104 and 108, control the bandwidth used by the other nodes 104 and 108, and/or provide other control functions.

In one implementation, one or more of the nodes 104-108 may include a multicarrier apparatus, transmitter, receiver, transceiver, modem, or the like, (generically referred to herein as a "transceiver 116") for communication via the network. Accordingly, the nodes 104-108 may include structure and functionality that enable signal communication over the medium 102. Such structure and functionality may include one or more antennas, integrated wire line interfaces, and the like. Depending on the implementation, the nodes 104-108 may communicate with one another directly (peer-to-peer mode) or the nodes 104-108 may communicate via the controller node 106. In one implementation, the nodes 104-108 are Orthogonal Frequency Division Multiplexing (OFDM) apparatuses capable of implementing the herein described implementations. For example, the nodes 104-108 may include a transceiver and/or a controller, as is discussed below.

In one implementation, system 100 may be a home network and one or more of the nodes 104-108 may be an access point of the home network. For example, in the implementation the controller node 106 may be a residential gateway that distributes broadband services to the other nodes (e.g., nodes 104 and 108). The nodes 104-108 may be associated with digital content destinations in the home, but may also be associated with digital content sources, such as digital video recorders (DVR), computers providing streaming video, televisions, entertainment centers, and the like.

Furthermore, the nodes 104-108 may be enabled to communicate using packet-based technology (e.g., ITU G.hn, HomePNA, HomePlug® AV and Multimedia over Coax Alliance (MoCA)) and xDSL technology). Such xDSL technology may include Asymmetric Digital Subscriber Line (ADSL), ADSL2, ADSL2+, Very high speed DSL (VDSL), VDSL2, G.Lite, and High bit rate Digital Subscriber Line (HDSL). In addition, the nodes 104-108 may be enabled to communicate using IEEE 802.11 and IEEE 802.16 (WiMAX) wireless technologies.

Figure 2:
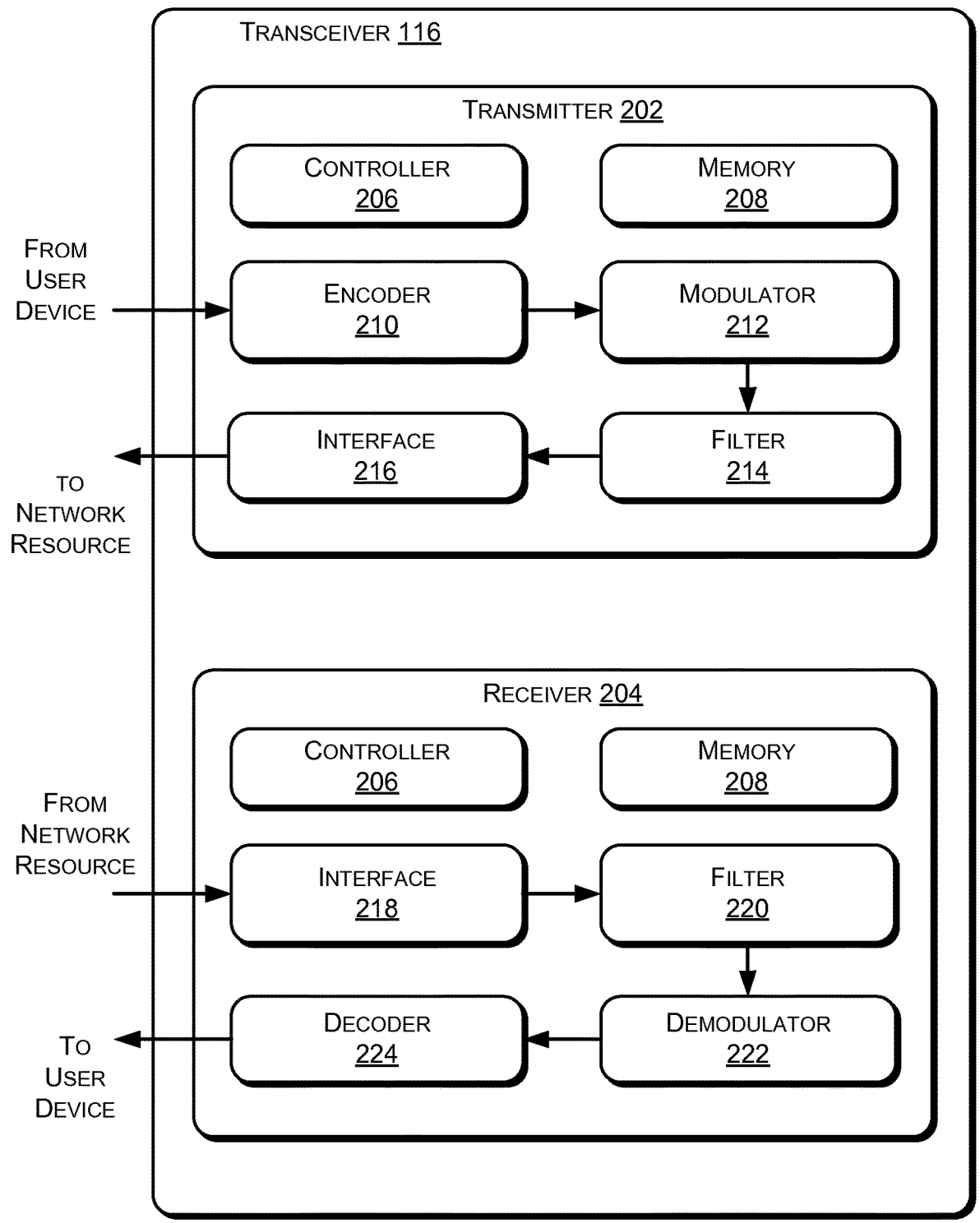
FIG. 2 is a block diagram illustrating one example of a node implemented as part of the network of FIG. 1.

In the example of FIG. 1, each of the nodes is shown having a transceiver 116. An example transceiver 116 is illustrated in FIG. 2. The transceiver 116 may include a transmitter portion 202 and/or a receiver portion 204, where one or both of the portions may include a controller 206 and/or memory 208. In various implementations, a single controller 206 may be shared by the transmitter 202 and the receiver 204. Likewise, in some implementations, a single memory 208 may be shared by the transmitter 202 and the receiver 204, or alternately the memory 208 may be comprised of multiple memory devices distributed in one or more of the transceiver 116, the transmitter 202, and the receiver 204.

As used herein, the term "controller 206" is meant generally to include all types of digital processing devices including, without limitation, digital signal processors (DSPs), reduced instruction set computers (RISC), general-purpose (CISC) processors, microprocessors, gate arrays (e.g., FPGAs), programmable logic devices (PLDs), reconfigurable compute fabrics (RCFs), array processors, secure microprocessors, and application-specific integrated circuits (ASICs). Such digital processors may be contained on a single unitary IC die, or distributed across multiple components. If included, the controller 206 may direct the flow of information through the transceiver 116, may provide timing to the components of the transceiver 116, may determine MAC cycle synchronization or alignment as discussed below, and the like.

If included, the memory 208 may store executable instructions, software, firmware, operating systems, applications, preselected values and constants, and the like, to be executed or used by the controller 206, for example. In various implementations, the memory 208 may include computer-readable media. Computer-readable media may include, for example, computer storage media. Computer storage media, such as memory 208, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device (such as the controller 206). Although the computer storage media (memory 208) is shown within the transceiver 116 it will be appreciated that the memory 208 may be distributed or located remotely and accessed via a network or other communication link.

As shown in FIG. 2, an example transmitter 202 may include an encoder 210, a modulator 212, a filter 216, and an interface 214. In alternate implementations, a transmitter 202 may include fewer components, alternate components, or additional components and remain within the scope of the disclosure.

In an implementation, signals exchanged between the nodes 104-108 may include multicarrier symbols that each includes a plurality of tones or sub-channels. Each of the tones within a multicarrier symbol may have data bits modulated thereon that are intended for delivery from one of the nodes 104-108 to another. In an implementation, the transmitter 202 is arranged to modulate the data bits onto the tones and transmit the signals including the tones via the medium 102.

If included, the encoder 210 is arranged to receive data (e.g., from a user device) for communication to a receiving device coupled to the transceiver 116 via a wireless or wire line medium 102. More specifically, the encoder 210 is arranged to translate incoming data bit streams into in-phase and quadrature components for the plurality of tones. The encoder 210 may be arranged to output a number of symbol sequences that are equal to the number of tones available to the system 100.

If included, the modulator 212 is arranged to receive symbol sequences (e.g., from the encoder 210) to produce a modulated signal in the form of a discrete multi-tone signal. The modulator may pass the modulated signal to the filter 214 (if the filter is included) to undergo various filtering. In one implementation, the filtered signal is passed to the interface 216 for communication over the medium 102 to a receiving device. For example, the interface 216 may facilitate communication of the modulated signal to a network resource such as an automation control center, a surveillance hub, and the like.

In various implementations, the transceiver 116 may also include a receiver 204 that is capable of receiving modulated multi-tone signals communicated over the medium 102 from a transmitting device. As shown in FIG. 2, an example receiver 204 may include an interface 218, a filter 220, a demodulator 222, and a decoder 224. In alternate implementations, a receiver 204 may include fewer components, alternate components, or additional components and remain within the scope of the disclosure.

In one implementation, signals received by the receiver 204 may be passed to the filter 220 via the interface 218. The interface 218 may facilitate communication with a network resource, for example. After received signals undergo filtering by way of the filter 220 (if included), the filtered signals may be demodulated by the demodulator 222. The demodulated signals may be passed to and processed by the decoder 224.

If included, the decoder 224 produces data bit streams for consumption by a computing device, or the like. Effectively, the demodulator 222 and the decoder 224 perform the opposite functions of the modulator 212 and the encoder 210, respectively.

In various implementations, one or more of the controller 206, encoder 210, decoder 224, modulator 212, demodulator 222, interface 216 and/or 218, filter 214 and/or 220, as well other components, may be implemented in hardware, firmware, software, or the like, or in combinations thereof.

Exemplary implementations discussed herein may have various components collocated; however, it is to be appreciated that the various components of the system 100 may be located at distant portions of a distributed network, such as a communications network and/or the Internet, or within a dedicated secure, unsecured and/or encrypted arrangement. Thus, it should be appreciated that the components of the system 100 may be combined into one or more apparatuses, such as a modem, or collocated on a particular node of a distributed network, such as a telecommunications network. Moreover, it should be understood that the components of the described system 100 may be arranged at any location within a distributed network without affecting the operation of the system 100. For example, the various components can be located in a Central Office modem (CO, ATU-C, VTU-O), a Customer Premises modem (CPE, ATU-R, VTU-R), an xDSL management device, or some combination thereof. Similarly, one or more functional portions of the system 100 may be distributed between a modem and an associated computing device.

Example Power Boost Operations

Successful communications in communication networks (e.g., ITU-T G.9960/G.9961, IEEE 1901 FFT, IEEE 1901 Wavelet, etc.) using a communication medium (such as medium 102, for example) generally requires the detection of communicated packets of information.

Figure 3:
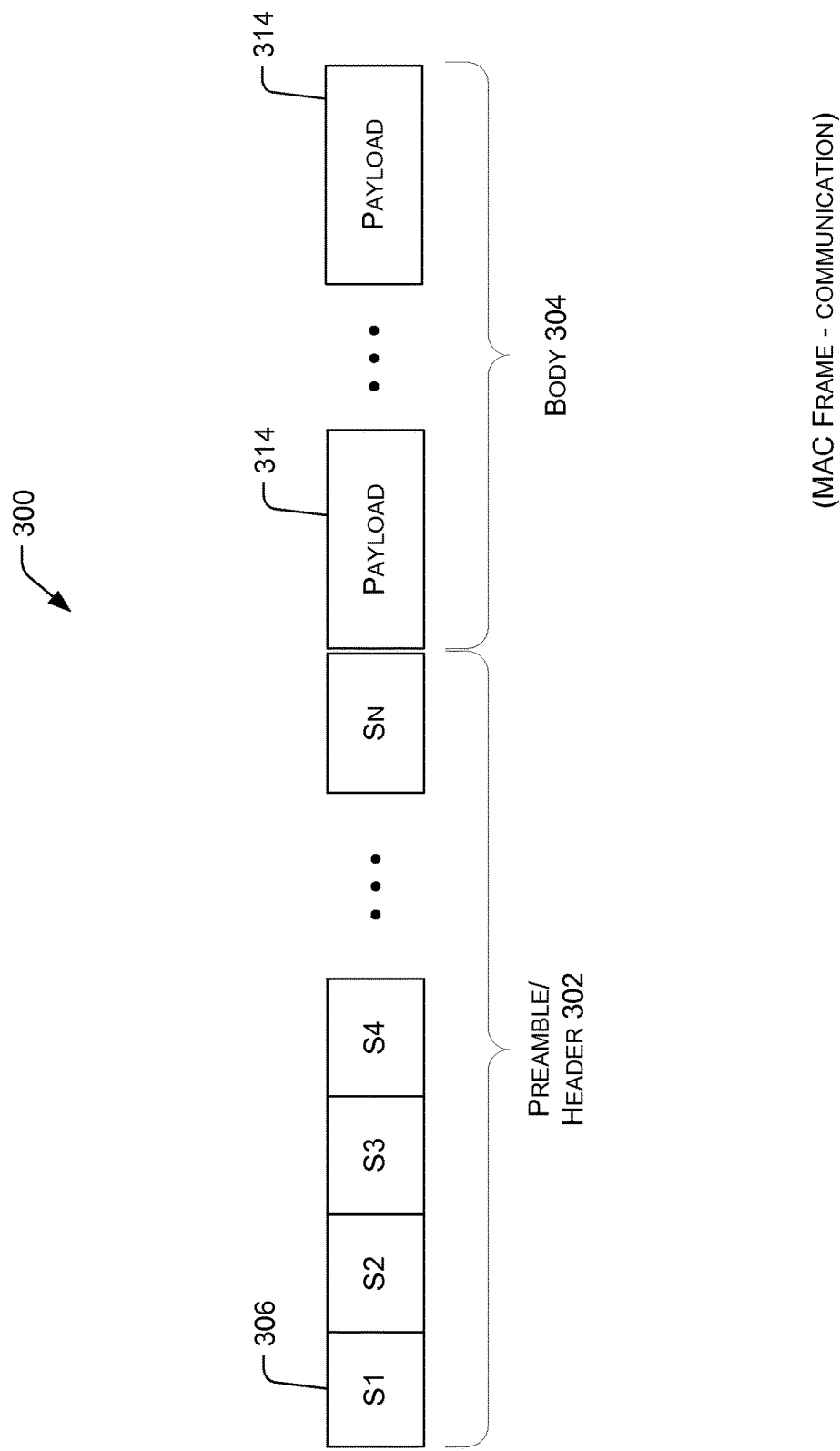
FIG. 3 is a schematic of an example communication block, according to an implementation.

FIG. 3 is a schematic of an example communication 300, according to an implementation. In the implementation, a node 104-108 or a neighbor node or network may periodically transmit a communication 300 as part of its operation, to inform other nodes or networks, among other things, of the node's timing information and/or synchronization. For example, a controller 206 at a node 104-108 may execute instructions stored in a memory 208 at the node 104-108 to generate and/or transmit the communication 300 via the medium 102. In one implementation, the communication 300 is a mobile applications protocol (MAP) physical layer (PHY) frame communication. Similarly, a controller 206 at a node 104-108 may execute instructions stored in a memory 208 at the node 104-108 to receive and/or decode the communication 300 transmitted on the medium 102.

In one implementation, as shown in FIG. 3, the communication 300 includes a preamble/header portion 302 and a body portion 304. Although the preamble/header portion 302 is shown as being contiguous, it is also contemplated that the preamble and header may be two separate and distinct elements of the communication 300. The preamble/header portion 302 serves at least to alert all nodes to receive the communication 300 that the communication 300 is arriving on the medium 102. The preamble/header portion 302 may include a known sequence of 1's and 0's that allows time for one or more of the nodes 104-108 to detect the communication 300 and enter a state to receive data. The preamble/header portion 302 may also convey the length (in μsec) of the body portion 304, or the length individual payload sections of the body portion 304.

As illustrated in FIG. 3, the preamble/header portion 302 may be defined by S1, S2, S3, S4 . . . Sn symbols. A plurality of the S1, S2, S3, S4 . . . Sn symbols may be used for packet detection, timing estimation and frame synchronization, another one or more of the plurality of the S1, S2, S3, S4 . . . Sn symbols may be used to convey the length of the body portion 304, and another one or more of the plurality of the S1, S2, S3, S4 . . . Sn symbols may be used to convey auxiliary information.

In one implementation, the auxiliary information may include a boost power reference or indicator (e.g., in dB). The boost power reference indicates to a node 104-108 that symbols of a communication (e.g., data frame) generated thereby may be boosted to the boost power reference provided in the auxiliary information portion of the communication 300 (e.g., a MAP PHY frame/broadcast frame). The plurality of the S1, S2, S3, S4 . . . Sn symbols that may be used to convey auxiliary information may also indicate which portions of a communication (e.g., preamble and header) may be power boosted using the power boost reference provided in the communication 300.

In one implementation, the plurality of the S1, S2, S3, S4 . . . Sn symbols that may be used to convey auxiliary information may be used to convey further auxiliary information defining one or more rules for power boosting particular symbols of a data frame. For example, the one or more rules may indicate that one or more symbols associated with a payload may be power boosted to the provided power boost reference. Also, the one or more rules may indicate that symbols of a preamble/header may be power boosted to the provided power boost reference if a length of an associated frame exceeds a given or predetermined length.

By decoding the communication 300 (e.g., a MAP PHY frame), a node 104-108 can determine which portions of a communication (e.g., preamble and header) may be power boosted according to the parameter(s) of the power boost reference provided in the communication 300. Using this information, one or more of the nodes 104-108, when generating a data frame, may power boost one or more symbols.

Figure 4:
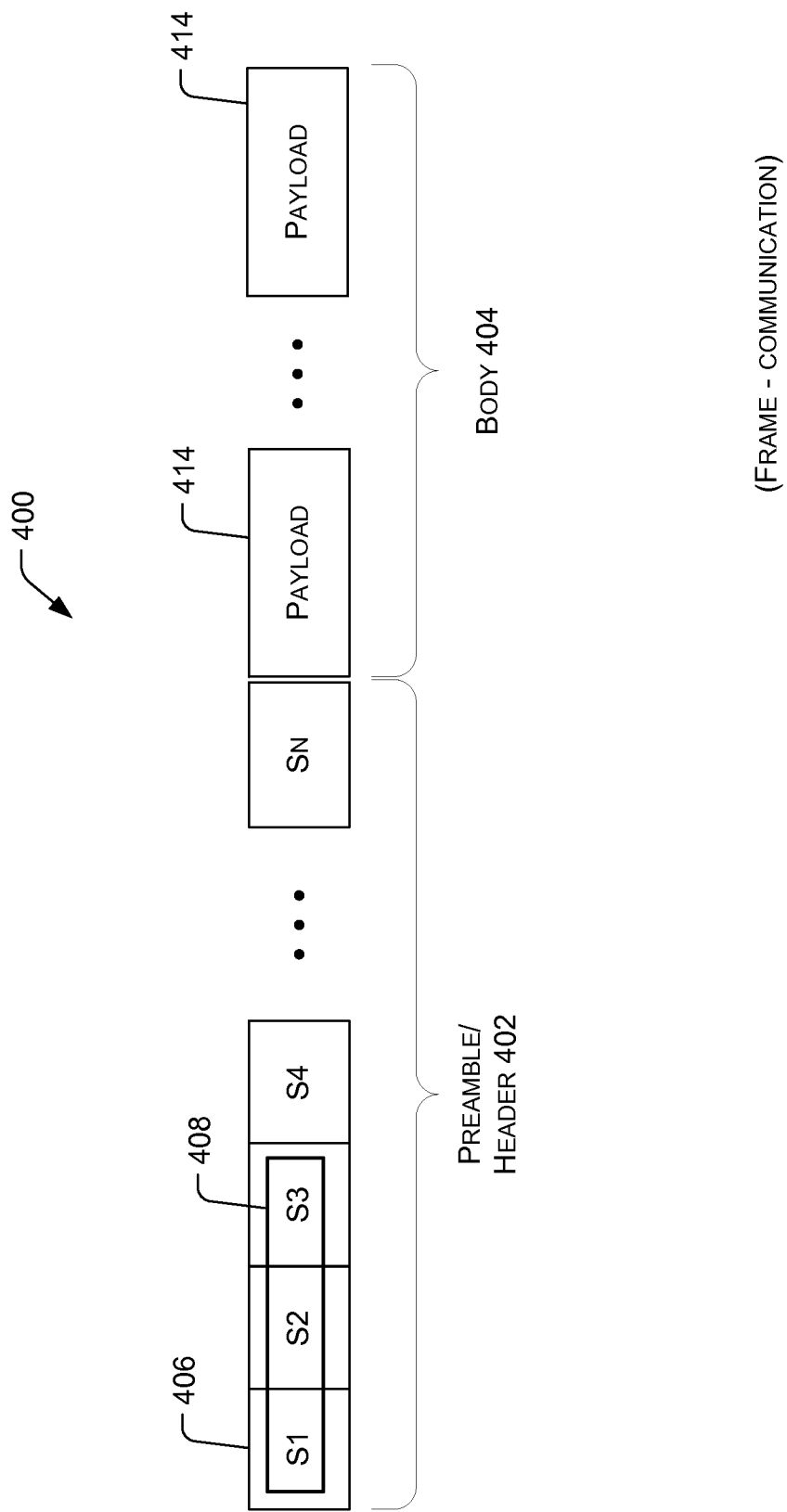
FIG. 4 is a schematic of an example communication block, according to an implementation.

FIG. 4 is a schematic of an example communication 400, according to an implementation. In one implementation, the communication 400 includes a preamble/header portion 402 and a body portion 404. Although the preamble/header portion 402 is shown as being contiguous, it is also contemplated that the preamble and header may be two separate and distinct elements of the communication 400. The preamble/header portion 402 serves at least to alert all nodes 104-108 to receive the communication 400 that the communication 400 is arriving on the medium 102. The preamble/header portion 402 may include a known sequence of 1's and 0's that allows time for the nodes to detect the communication 300 and enter a state to receive data. The preamble/header portion 402 may also convey the length (in μsec) of the body portion 404, or the length individual payload sections of the body portion 404.

As illustrated in FIG. 4, the preamble/header portion 402 may be defined by S1, S2, S3, S4 . . . Sn symbols. A plurality of the S1, S2, S3, S4 . . . Sn symbols may be used for packet detection, timing estimation and frame synchronization, another one or more of the plurality of the S1, S2, S3, S4 . . . Sn symbols may be used to convey the length of the body portion 404, and another one or more of the plurality of the S1, S2, S3, S4 . . . Sn symbols may be used to convey auxiliary information. In this example, the group of symbols S1-S3, shown by reference numeral 408, have been power boosted. In one implementation, the group of symbols S1-S3 408 is power boosted in accordance with auxiliary information received in a broadcast message or MAP PHY frame transmitted by a node (e.g., a master node). The power boosted group of symbols S1-S3 408 may enable a receiving node to quickly and efficiently detect the communication 400.

In alternate implementations, one or more of the above techniques may be employed concurrently, or another technique may be used to accomplish the same or similar results. The implementations herein are described in terms of exemplary embodiments. However, it should be appreciated that individual aspects of the implantations may be separately claimed and one or more of the features of the various embodiments may be combined.

Representative Processes

Figure 5:
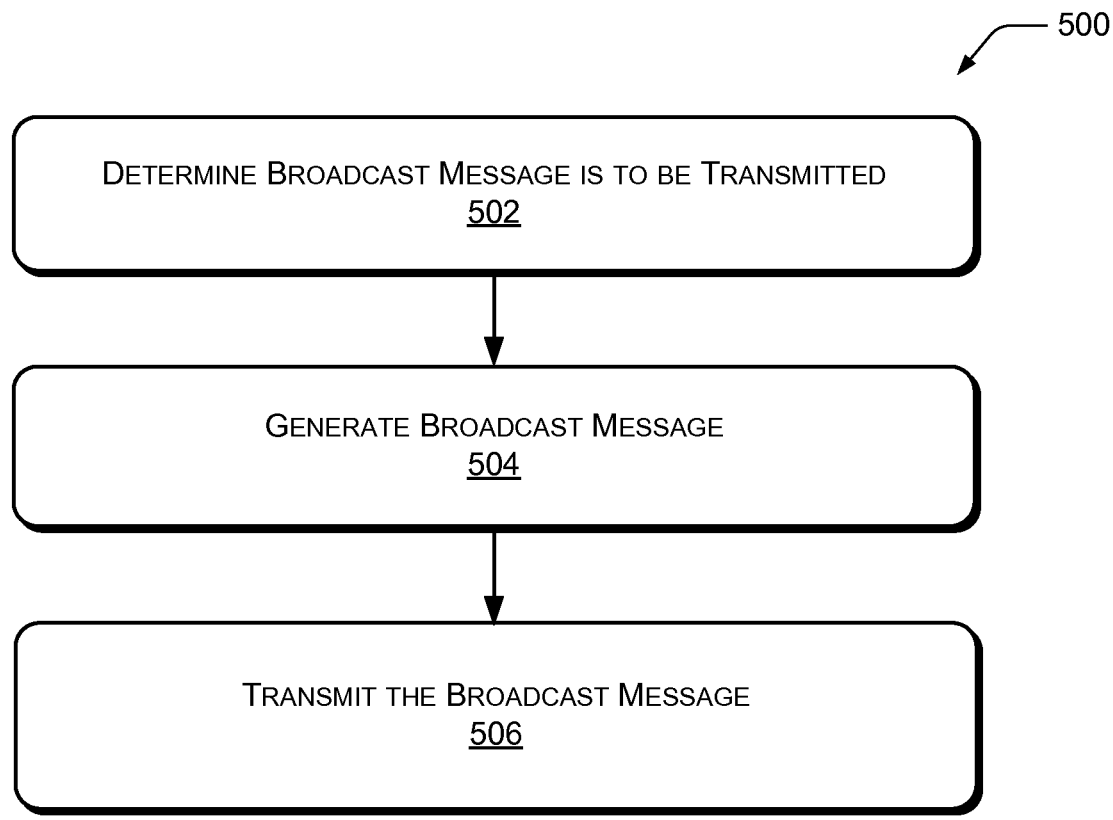
FIG. 5 illustrates a representative process for generating a communication at a node that includes auxiliary information that contains power boost information.

FIG. 5 illustrates a representative process 500 for generating a communication (e.g., communication 300) at a node (e.g., nodes 104-108) that includes auxiliary information that contains power boost information. The described techniques may also be used with domains, networks, and the like. An example process 500 may be performed on a system 100, for example, where a common network communication medium 102 is shared. However, other communication media may also be used with the representative process 500. In one example, the communication network medium 102 comprises a single communication channel and at least two nodes (such as one or more of the nodes 104-108) representing discrete homogeneous networks are communicatively coupled to the single communication channel. The process 500 is described with reference to FIGS. 1-4.

At block 502, a node (such as nodes 104-108) determines that a broadcast message is to be transmitted. The determination to transmit a broadcast message may be based on a plurality of factors. Typical factors may include facilitating discovery, initiating network maintenance, providing route discovery, conveying information, etc. In one example, the broadcast message may be a communication 300. In one implementation, the broadcast message is a mobile application protocol (MAP) physical layer (PHY) frame.

At block 504, the node generates the broadcast message. The broadcast message includes a preamble/header portion and a body portion. The preamble/header portion may be defined by S1, S2, S3, S4 . . . Sn symbols. A plurality of the S1, S2, S3, S4 . . . Sn symbols may be used for packet detection, timing estimation and frame synchronization, another one or more of the plurality of the S1, S2, S3, S4 . . . Sn symbols may be used to convey the length of the body portion, and another one or more of the plurality of the S1, S2, S3, S4 . . . Sn symbols may be used to convey auxiliary information. In one implementation, the auxiliary information may include a boost power reference or indicator (e.g., in dB). The boost power reference indicates to a node that symbols of a communication (e.g., data frame) generated thereby may be boosted to the boost power reference provided in the auxiliary information portion of the broadcast message. The plurality of the S1, S2, S3, S4 . . . Sn symbols that may be used to convey auxiliary information may also indicate which portions of a communication (e.g., preamble and header) may be power boosted using the power boost reference provided in the broadcast message.

In one implementation, the plurality of the S1, S2, S3, S4 . . . Sn symbols that may be used to convey auxiliary information may be used to convey further auxiliary information defining one or more rules for power boosting particular symbols of a data frame. For example, the one or more rules may indicate that one or more symbols associated with a payload may be power boosted to the provided power boost reference. Also, the one or more rules may indicate that symbols of a preamble/header may be power boosted to the provided power boost reference if a length of an associated frame exceeds a given or predetermined length.

At block 506, the broadcast message is transmitted by the node on the communication medium. In one implementation, the broadcast message is transmitted on the communication medium for reception by one or more nodes that are associated with the communication medium. In another implementation, the broadcast message is transmitted to one or more particular nodes.

Figure 6:
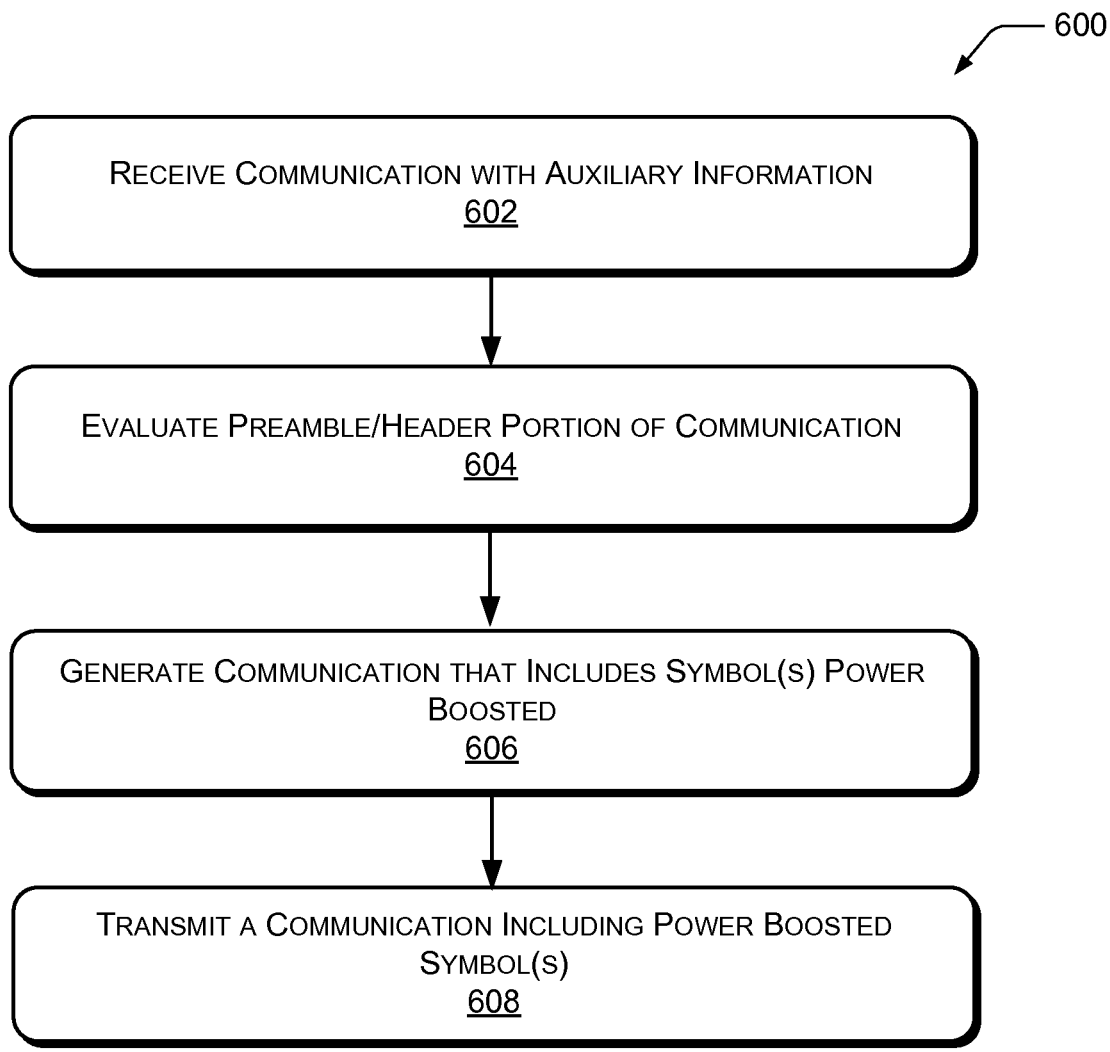
FIG. 6 illustrates a representative process for generating a communication at a node that includes one or more symbols power boosted in accordance with auxiliary information conveyed in a communication.

FIG. 6 illustrates a representative process 600 for generating a communication (e.g., communication 400) at a node (e.g., nodes 104-108) that includes one or more symbols power boosted in accordance with auxiliary information conveyed in a communication (e.g., communication 300). The described techniques may also be used with domains, networks, and the like. An example process 600 may be performed on a system 100, for example, where a common network communication medium 102 is shared. However, other communication media may also be used with the representative process 600. In one example, the communication network medium 102 comprises a single communication channel and at least two nodes (such as one or more of the nodes 104-108) representing discrete homogeneous networks are communicatively coupled to the single communication channel. The process 600 is described with reference to FIGS. 1-5.

At block 602, a communication (e.g., communication 300) is received at a node (e.g., nodes 104-108). The communication includes a preamble/header portion and a body portion. The preamble/header portion may be defined by S1, S2, S3, S4 . . . Sn symbols. A plurality of the S1, S2, S3, S4 . . . Sn symbols may be used for packet detection, timing estimation and frame synchronization, another one or more of the plurality of the S1, S2, S3, S4 . . . Sn symbols may be used to convey the length of the body portion, and another one or more of the plurality of the S1, S2, S3, S4 . . . Sn symbols may be used to convey auxiliary information. In one implementation, the auxiliary information includes a boost power reference or indicator (e.g., in dB). The boost power reference indicates to a node that symbols of a communication (e.g., data frame) generated thereby may be boosted to the boost power reference provided in the auxiliary information portion of the broadcast message. The plurality of the S1, S2, S3, S4 . . . Sn symbols that may be used to convey auxiliary information may also indicate which portions of a communication (e.g., preamble and/or header) may be power boosted using the power boost reference provided in the broadcast message.

In one implementation, the plurality of the S1, S2, S3, S4 . . . Sn symbols that may be used to convey auxiliary information may be used to convey further auxiliary information defining one or more rules for power boosting particular symbols of a data frame. For example, the one or more rules may indicate that one or more symbols associated with a payload may be power boosted to the provided power boost reference. Also, the one or more rules may indicate that symbols of a preamble/header may be power boosted to the provided power boost reference if a length of an associated frame exceeds a given or predetermined length.

At block 604, the node receiving the communication evaluates at least the preamble/header portion of the communication to determine that auxiliary information is associated with one or more symbols of the preamble/header portion of the communication.

At block 606, the node receiving the communication generates a communication (e.g., communication 400) that includes one or more symbols power boosted in accordance with the auxiliary information contained in the communication received at block 602. In one implementation, the generated communication includes one or more symbols of the preamble power boosted. In another implementation, the generated communication includes one or more symbols of the header power boosted. In yet another implementation, the generated communication includes one or more symbols of the preamble and header power boosted. In yet another implementation, the node generates a communication with one or more symbols power boosted based on one or more rules set forth in the auxiliary information contained in the communication received at block 602.

At block 608, the process includes transmitting a communication (such as communication 400) including one or more power boosted symbols.

The order in which the processes 500 and 600 are described is not intended to be construed as a limitation, and any number of the described process blocks can be combined in any order to implement the processes, or alternate processes. Additionally, individual blocks may be deleted from the processes without departing from the spirit and scope of the subject matter described herein. Furthermore, the processes can be implemented in any suitable hardware, software, firmware, or a combination thereof, without departing from the scope of the subject matter described herein.

In alternate implementations, other techniques may be included in the processes 500 and 600 in various combinations, and remain within the scope of the disclosure.

The above-described arrangements, apparatuses and methods may be implemented in a software module, a software and/or hardware testing module, a telecommunications test device, a DSL modem, an ADSL modem, an xDSL modem, a VDSL modem, a linecard, a G.hn transceiver, a MOCA transceiver, a Homeplug transceiver, a powerline modem, a wired or wireless modem, test equipment, a multicarrier transceiver, a wired and/or wireless wide/local area network system, a satellite communication system, network-based communication systems, such as an IP, Ethernet or ATM system, a modem equipped with diagnostic capabilities, or the like, or on a separate programmed general purpose computer having a communications device or in conjunction with any of the following communications protocols: CDSL, ADSL2, ADSL2+, VDSL1, VDSL2, HDSL, DSL Lite, IDSL, RADSL, SDSL, UDSL, MOCA, G.hn, Homeplug or the like.

Additionally, the arrangements, procedures and protocols of the described implementations may be implemented on a special purpose computer, a programmed microprocessor or microcontroller and peripheral integrated circuit element(s), an ASIC or other integrated circuit, a digital signal processor, a flashable device, a hard-wired electronic or logic circuit such as discrete element circuit, a programmable logic device such as PLD, PLA, FPGA, PAL, a modem, a transmitter/receiver, any comparable device, or the like. In general, any apparatus capable of implementing a state machine that is in turn capable of implementing the methodology described and illustrated herein may be used to implement the various communication methods, protocols and techniques according to the implementations.

Furthermore, the disclosed procedures may be readily implemented in software using object or object-oriented software development environments that provide portable source code that can be used on a variety of computer or workstation platforms. Alternatively, the disclosed arrangements may be implemented partially or fully in hardware using standard logic circuits or VLSI design. The communication arrangements, procedures and protocols described and illustrated herein may be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed procedures may be readily implemented in software that can be stored on a computer-readable storage medium (such as memory 208), executed on programmed general-purpose computer with the cooperation of a controller (such as controller 206) and memory 208, a special purpose computer, a microprocessor, or the like. In these instances, the arrangements and procedures of the described implementations may be implemented as program embedded on personal computer such as an applet, JAVA® or CGI script, as a resource residing on a server or computer workstation, as a routine embedded in a dedicated communication arrangement or arrangement component, or the like. The arrangements may also be implemented by physically incorporating the arrangements and/or procedures into a software and/or hardware system, such as the hardware and software systems of a test/modeling device.

CONCLUSION

Although the implementations of the disclosure have been described in language specific to structural features and/or methodological acts, it is to be understood that the implementations are not necessarily limited to the specific features or acts described. Rather, the specific features and acts are disclosed as representative forms of implementing the invention.

What is claimed is:
1. A method, comprising:
    decoding, at a node, a mobile application protocol (MAP) physical layer (PHY) frame, the MAP PHY frame including one or more symbols carrying auxiliary information that includes power boost information and further includes one or more rules defining usage of the power boost information,
        wherein the one or more rules indicates that one or more symbols is to be power boosted if a frame length is equal or greater than a frame length value defined in the one or more rules, generating a data frame, the data frame including particular symbols set at a boosted power level in accordance with the power boost information of the auxiliary information, wherein particular symbols comprises symbols set at a boosted power level on a per symbol basis, and transmitting the data frame.

2. The method of claim 1, wherein the one or more symbols at the power level in accordance with the power boost information of the auxiliary information are at least associated with a preamble of the data frame.

3. The method of claim 1, wherein the one or more symbols at the power level in accordance with the power boost information of the auxiliary information are at least associated with a header of the data frame.

4. The method of claim 1, wherein the one or more symbols at the power level in accordance with the power boost information of the auxiliary information are at least associated with a preamble and a header of the data frame.

5. The method of claim 1, wherein the act of generating the data frame includes power boosting the one or more symbols from a first power level to second power level based on the power boost information of the auxiliary information.

6. A system, comprising:
a communication network medium, and
at least one node coupled to the medium, the node arranged to communicate, at least in part via the medium, a frame that includes power boost information and further includes one or more rules defining usage of the power boost information,
wherein the one or more rules indicates that one or more symbols is to be power boosted if a frame length is equal or greater than a frame length value defined in the one or more rules,
wherein the power boost information indicates particular symbols are power boosted in that frame, and
wherein particular symbols comprises symbols power boosted on a per symbol basis.

7. The system of claim 6, wherein the communication network medium comprises a network of electrical power distribution conductors.

8. The system of claim 6, wherein the power boost information includes a power boost value in decibel (dB).

9. The system of claim 6, wherein the frame comprises at least a preamble portion, the preamble portion to carry the power boost information.

10. The system of claim 9, wherein one or more symbols of the preamble portion carry the power boost information.

11. The system of claim 6, wherein the frame comprises at least a header portion, the preamble portion to carry the power boost information.

12. The system of claim 11, wherein one or more symbols of the header portion carry the power boost information.

13. The system of claim 6, wherein the frame is a broadcast message, the broadcast message for transmission to a plurality of nodes coupled to the communication network medium.

14. The system of claim 13, wherein the broadcast message is a mobile applications protocol (MAP) physical layer (PHY) frame communication.

15. A node, comprising:
a controller, and
a storage memory coupled to the controller and including instructions to generate at least one communication for communication on a communication medium when executed by the controller, the at least one communication to include:
a first portion to carry auxiliary information, the auxiliary information including at least power boost information and one or more rules defining usage of the power boost information,
wherein the one or more rules indicates that one or more symbols is to be power boosted if a frame length is equal or greater than a frame length value defined in the one or more rules, and
wherein the power boost information indicates that particular symbols are power boosted, wherein particular symbols comprises symbols power boosted on a per symbol basis, and
a second portion to carry payload data.

16. The node of claim 15, wherein the auxiliary information further includes at least one rule defining usage of the power boost information.

17. The node of claim 16, wherein the at least one rule indicates that the power boost information is to be used to change a power level of one or more symbols in a communication for transmission on the communication medium.

18. The node of claim 15, wherein the power boost information is a decibel value.

* * * * *